US012014494B2

(12) United States Patent
Huang et al.

(10) Patent No.: US 12,014,494 B2
(45) Date of Patent: Jun. 18, 2024

(54) IMAGE PROCESSING METHOD AND APPARATUS, SCREENING SYSTEM, COMPUTER-READABLE STORAGE MEDIUM FOR IMPROVING SCREENING PERFORMANCE

(71) Applicants: BEIJING BOE HEALTH TECHNOLOGY CO., LTD., Beijing (CN); BOE TECHNOLOGY GROUP CO., LTD., Beijing (CN)

(72) Inventors: Jiao Huang, Beijing (CN); Cuifang Zhang, Beijing (CN)

(73) Assignees: Beijing BOE Health Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 341 days.

(21) Appl. No.: 17/427,347

(22) PCT Filed: Jan. 13, 2021

(86) PCT No.: PCT/CN2021/071374
§ 371 (c)(1),
(2) Date: Jul. 30, 2021

(87) PCT Pub. No.: WO2021/164470
PCT Pub. Date: Aug. 26, 2021

(65) Prior Publication Data
US 2022/0318992 A1    Oct. 6, 2022

(30) Foreign Application Priority Data

Feb. 20, 2020   (CN) .......................... 202010104357.X

(51) Int. Cl.
*G06V 40/18* (2022.01)
*G06T 7/00* (2017.01)

(52) U.S. Cl.
CPC .......... *G06T 7/0012* (2013.01); *G06V 40/193* (2022.01); *G06V 40/197* (2022.01);
(Continued)

(58) Field of Classification Search
None
See application file for complete search history.

(56) References Cited

U.S. PATENT DOCUMENTS 8,896,682 B2 * 11/2014 Bressler ............... A61B 3/0025
348/78
2011/0242306 A1 * 10/2011 Bressler ............... A61B 3/0025
382/128

(Continued)

FOREIGN PATENT DOCUMENTS

CN    105513077 A    4/2016
CN    106934798 A    7/2017
(Continued)

OTHER PUBLICATIONS

Wijesinghe et al., "Transfer Learning with Ensemble Feature Extraction and Low-rank Matrix Factorization for Severity Stage Classification of Diabetic Retinopathy", 2019 IEEE 31st International Conference on Tools with Artificial Intelligence (ICTAI), IEEE, Nov. 4, 2019, pp. 931-938.

*Primary Examiner* — Idowu O Osifade
(74) *Attorney, Agent, or Firm* — The Webb Law Firm

(57) ABSTRACT

The present disclosure relates to an image processing method and apparatus, a screening system, and a computer-readable storage medium. An image processing method includes: acquiring an image to be processed; extracting a first feature of the image to be processed by using a first feature extractor; performing first classification on the image to be processed according to the first feature by using a first classifier; under the condition that a classification result is a first result, extracting a second feature of the image to be (Continued)

processed by using a second feature extractor; performing second classification on the image to be processed according to the second feature by using a second classifier; and outputting the classification result of the second classification.

19 Claims, 6 Drawing Sheets

(52) U.S. Cl.
CPC ............... *G06T 2207/30041* (2013.01); *G06T 2207/30096* (2013.01)

(56) References Cited

U.S. PATENT DOCUMENTS

| | | |
|---|---|---|
| 2018/0235467 A1 | 8/2018 | Celenk et al. |
| 2022/0151568 A1* | 5/2022 | Yao ........................ G16H 50/20 |
| 2022/0254500 A1* | 8/2022 | El-Baz .................. G06T 7/0012 |

FOREIGN PATENT DOCUMENTS

| | | |
|---|---|---|
| CN | 107330449 A | 11/2017 |
| CN | 108615051 A | 10/2018 |
| CN | 108764051 A | 11/2018 |
| CN | 108921169 A | 11/2018 |
| EP | 3779786 A1 | 2/2021 |
| JP | H05303642 A | 11/1993 |

* cited by examiner

IMAGE PROCESSING METHOD AND APPARATUS, SCREENING SYSTEM, COMPUTER-READABLE STORAGE MEDIUM FOR IMPROVING SCREENING PERFORMANCE

CROSS-REFERENCE TO RELATED APPLICATIONS

This application is a U.S. National Stage Application under U.S.C. § 371 of International Patent Application No. PCT/CN2021/071374, filed on Jan. 13, 2021, which is based on and claims the priority to the Chinese patent application No. 202010104357.X filed on Feb. 20, 2020, the disclosure of both of which is hereby incorporated by reference in its entirety into the present application.

TECHNICAL FIELD

The present disclosure relates to the field of computer technologies, and particularly, to an image processing method and apparatus, a screening system, and a computer-readable storage medium.

BACKGROUND

Diabetic retinopathy (DR for short) is a common chronic complication of diabetics. Early screening for the DR can effectively prevent further vision deterioration.

SUMMARY

According to some embodiments of the present disclosure, there is provided an image processing method comprising: acquiring an image to be processed; extracting a first feature of the image to be processed by using a first feature extractor; performing first classification on the image to be processed according to the first feature by using a first classifier; under the condition that a classification result is a first result, extracting a second feature of the image to be processed by using a second feature extractor; performing second classification on the image to be processed according to the second feature by using a second classifier; and outputting the classification result of the second classification.

In some embodiments, that extracting a first feature of the image to be processed by using a first feature extractor comprises: respectively extracting a plurality of first features of the image to be processed by using a plurality of first feature extractors cascaded in parallel, and fusing the extracted first features, wherein the first classification on the image to be processed is performed according to the fused first feature; and/or that extracting a second feature of the image to be processed by using a second feature extractor comprises: respectively extracting a plurality of second features of the image to be processed by using a plurality of second feature extractors cascaded in parallel, and fusing the extracted second features, wherein the second classification on the image to be processed is performed according to the fused second feature.

In some embodiments, the image to be processed is a fundus photograph; the first features comprise features of diabetic retinopathy and features of non-diabetic retinopathy; and the second features comprise the features of diabetic retinopathy and features of other fundus lesions than diabetic retinopathy.

In some embodiments, the first classification comprises classifying the fundus photograph as a photograph comprising the features of diabetic retinopathy or a photograph excluding the features of diabetic retinopathy, the first result indicates that the fundus photograph comprises the features of diabetic retinopathy; and the second classification comprises classifying the fundus photograph as a photograph comprising the features of diabetic retinopathy, or a photograph comprising the features of the other fundus lesions.

In some embodiments, the image processing method further comprises: under the condition that the classification result is a second result, extracting a third feature of the image to be processed by using a third feature extractor; performing third classification on the image to be processed according to the third feature by using a third classifier; and outputting the classification result of the third classification.

In some embodiments, the second result indicates that the fundus photograph excludes the features of diabetic retinopathy; the third feature comprises features without fundus lesions and features of other fundus lesions; and the third classification comprises classifying the fundus photograph as a photograph excluding the features of fundus lesions, or a photograph comprising the features of other fundus lesions.

In some embodiments, at least one of the first classifier, the second classifier, and the third classifier is an Xgboost classifier.

In some embodiments, that extracting a third feature of the image to be processed by using a third feature extractor comprises: respectively extracting a plurality of third features of the image to be processed by using a plurality of third feature extractors cascaded in parallel, and fusing the extracted third features, wherein the third classification on the image to be processed is performed according to the fused third feature.

In some embodiments, the image processing method further comprises: inputting user information, and storing the user information and the classification result in association.

In some embodiments, the plurality of first feature extractors comprise different kinds of first feature extractors; and/or the plurality of second feature extractors comprise different kinds of second feature extractors.

In some embodiments, the plurality of first feature extractors comprises 3 first feature extractors, which are respectively SE-ResNet, ResNext, InceptionV3 networks.

In some embodiments, the plurality of second feature extractors comprises 3 second feature extractors, which are respectively SE-ResNet, ResNext, InceptionV3 networks.

In some embodiments, that fusing the extracted first features comprises: transversely splicing the extracted plurality of first features to obtain the fused first feature.

In some embodiments, that fusing the extracted second features comprises: transversely splicing the extracted plurality of second features to obtain the fused second feature.

According to other embodiments of the present disclosure, there is provided an image processing apparatus comprising: an acquisition unit configured to acquire an image to be processed; a first feature extractor configured to extract a first feature of the image to be processed; a first classifier configured to perform first classification on the image to be processed; a second feature extractor configured to extract, under the condition that a classification result is a first result, a second feature of the image to be processed; a second classifier configured to perform second classification on the image to be processed according to a second feature; and an output unit configured to output the classification result of the second classification.

According to still other embodiments of the present disclosure, there is provided an image processing apparatus comprising: a memory; and a processor coupled to the memory, the processor being configured to perform, based on instructions stored in the memory, the image processing method of any of the foregoing embodiments.

According to further embodiments of the present disclosure, there is provided a computer-readable storage medium having stored thereon a computer program which, when executed by a processor, implements the image processing method of any of the foregoing embodiments.

According to other embodiments of the present disclosure, there is provided a screening system of diabetic retinopathy, comprising: the image processing apparatus of any of the foregoing embodiments, configured to perform classification on the fundus photograph of the user.

In some embodiments, the screening system further comprises an image sensor configured to take the fundus photograph of the user.

In some embodiments, the screening system further comprises an input device configured to input the user information; and a memory configured to store the user information and the classification result in association.

Other features of the present disclosure and advantages thereof will become apparent from the following detailed description of exemplary embodiments thereof, which proceeds with reference to the accompanying drawings.

BRIEF DESCRIPTION OF THE DRAWINGS

The accompanying drawings, which constitute a part of this specification, illustrate embodiments of the present disclosure and, together with the specification, serve to explain the principles of the present disclosure.

The present disclosure may be more clearly understood from the following detailed description made with reference to the accompanying drawings, in which.

It should be understood that sizes of various parts shown in the accompanying drawings are not drawn to actual scales. Furthermore, identical or similar reference numerals denote identical or similar components.

DETAILED DESCRIPTION

Figure 1:
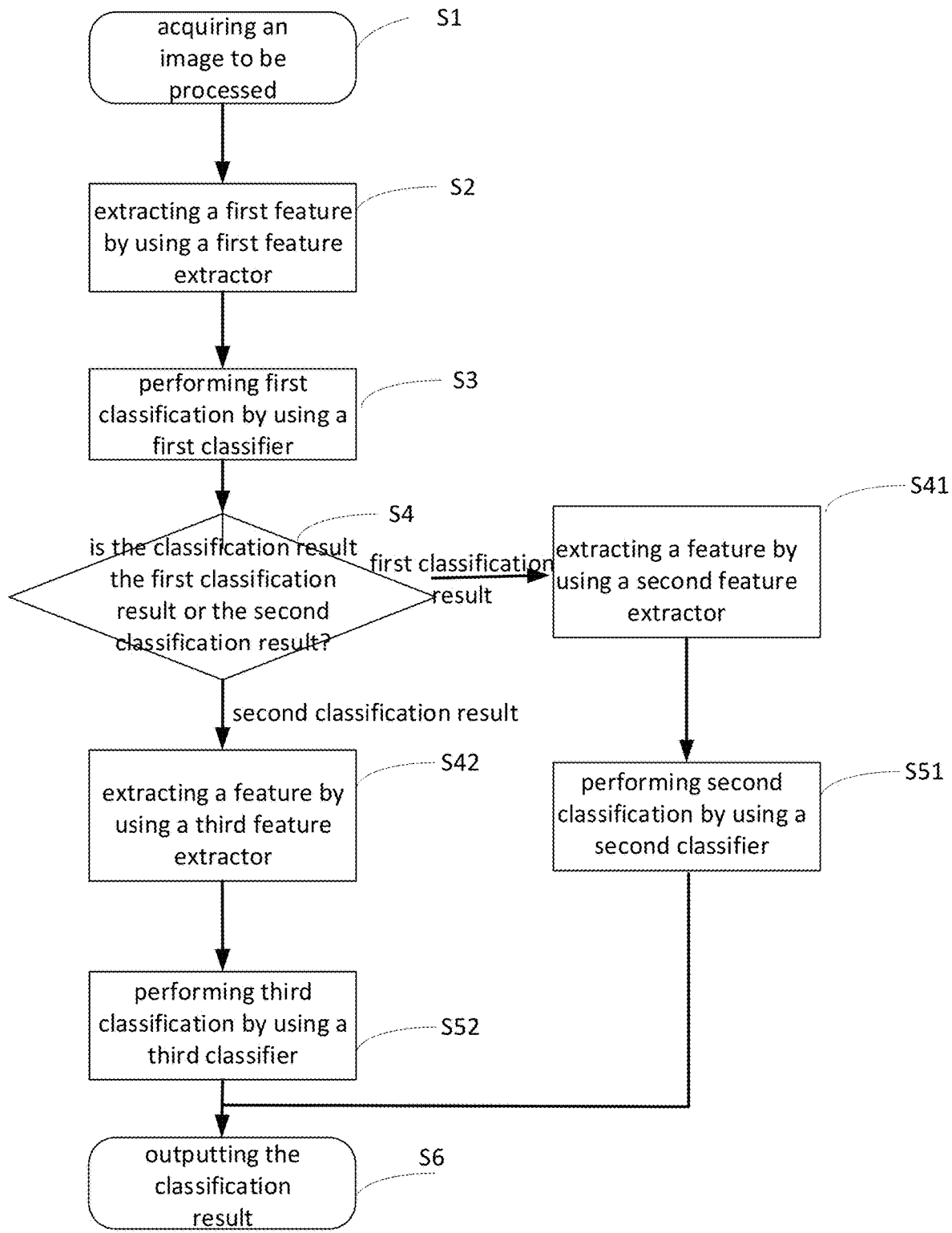
FIG. 1 is a flow diagram illustrating an image processing method according to an embodiment of the present disclosure.

Various exemplary embodiments of the present disclosure will now be described in detail with reference to the accompanying drawings. The description of the exemplary embodiments is merely illustrative and is in no way intended to limit this disclosure, its application, or uses. The present disclosure can be implemented in many different forms and is not limited to the embodiments described herein. These embodiments are provided to make this disclosure thorough and complete, and fully convey the scope of this disclosure to those skilled in the art. It should be noted that: relative arrangements of components and steps set forth in these embodiments should be construed as exemplary only instead of limitative unless specifically stated otherwise.

All terms (comprising technical or scientific terms) used herein have the same meanings as those commonly understood by one of ordinary skill in the art to which this disclosure belongs unless specifically defined otherwise. It will be further understood that terms defined in, e.g. common dictionaries, should be interpreted as having meanings consistent with their meanings in the context of the related art and will not be interpreted as an idealized or extremely formalized meanings unless expressly defined herein.

Techniques, methods, and apparatuses known to one of ordinary skill in the related art may not be discussed in detail but are intended to be regarded as a part of the specification where appropriate.

Image classification by using machine learning is very common in various fields. Feature extraction is a key to the machine learning, and the quality of extracted features directly affects classification accuracy and generalization performance of a classifier.

Ina related technique, some features manually extracted, e.g., vascular profile, red lesions (micro blood flow), luminance lesions (exudation, cotton wool patches) are recognized and judged through a classifier, so as to screen diabetic retinopathy. The feature extraction in the related technique is to extract key features by preprocessing data and then combining prior knowledge, or to extract features by using a principal component analysis method, a chi-square test method, a mutual information selection method and the like. Such a manual feature extraction method has certain limitations because it mainly relies on the prior knowledge, and it is hard to utilize the advantages of big data, so that the extracted features are too limited to make full use of information in the image, which results in limited accuracy and low robustness in practical applications.

As an example, in the medical field, the above problem is obvious. For example, in the screening of the diabetic retinopathy, the manual feature extraction method cannot make full use of information in the fundus photograph, and many other retinopathies will be misjudged as the diabetic retinopathy in practical applications.

With the development of deep learning, a deep neural network can learn higher-level feature information from a large amount of original data for classification, which eliminates complex feature extraction and selection.

In another related technique, required features are automatically learned from training data by a deep convolution neural network, and they are classified and judged, so that certain accuracy is achieved on test data. At present, compared with the traditional manual feature extraction method, a deep learning algorithm applied to diabetic retinopathy recognition has a further improved screening performance, but the features extracted by the used convolution neural network are not comprehensive enough, and the screening performance for the diabetic retinopathy is not good enough and still has a room for improvement.

In view of this problem, the present disclosure provides an image processing method capable of making full use of the fundus photograph information, to further improve the screening performance of the diabetic retinopathy, so as to assist a doctor to quickly, accurately and effectively screen the diabetic retinopathy.

In the following embodiments, a process of carrying out the image processing method of the present disclosure will be described by taking the DR screening in the medical field as an example. It can be understood by those skilled in the art that the disclosed image processing method is also applicable in other fields.

Although the embodiments of the present application provide operation instruction steps of the method shown in the following embodiments or the accompanying drawings, more or less operation instruction steps can be comprised in the method. In steps where there is no necessary causal relationship logically, an execution order of these steps is not limited to an execution order provided by the embodiments of the present application.

FIG. 1 is a flow diagram illustrating an image processing method according to an embodiment of the present disclosure. The image processing method can be performed by an image processing apparatus.

As shown in FIG. 1, the image processing method comprises the following steps of: S1, acquiring an image to be processed; S2, extracting a first feature of the image to be processed by using a first feature extractor; and S3, performing first classification on the image to be processed according to the first feature by using a first classifier.

In some embodiments, the image to be processed is a fundus photograph of a user. For example, the fundus photograph of the user is taken with an image sensor, and transmitted to the image processing apparatus. The first feature comprises features of diabetic retinopathy and features of non-diabetic retinopathy. A retinopathy caused by non-diabetes indicates features excluding the diabetic retinopathy, in which both the case of normal without lesions and the case of other lesions than the diabetic retinopathy are involved. Correspondingly, the first classification comprises classifying the fundus photograph as a photograph comprising the features of diabetic retinopathy or a photograph excluding the features of diabetic retinopathy.

In other embodiments, that extracting a first feature of the image to be processed by using a first feature extractor comprises: respectively extracting a plurality of first features of the image to be processed by using a plurality of first feature extractors cascaded in parallel, and fusing the extracted first features. Correspondingly, the first classification on the image to be processed is performed according to the fused first feature.

In some embodiments, the plurality of first feature extractors comprise different kinds of first feature extractors. For example, the plurality of first feature extractors comprise 3 first feature extractors, which are respectively SE-ResNet, ResNext, InceptionV3 networks.

That cascaded in parallel is, for example, that the same image to be processed is accepted by the plurality of first feature extractors, each of which respectively outputs the extracted first features. That is, different first feature extractors output different first features.

In some embodiments, the fusing comprises splicing. For example, the first features extracted by the plurality of first feature extractors are respectively T1=[t11,t12,t13,t14], T2=[t21,t22,t23,t24] . . . Tn=[tn1,tn2,tn3,tn4]. The plurality of first features are spliced, for example, transversely spliced, and the resulting fused first feature is T=[t11,t12,t13,t14,t21, t22,t23,t24 . . . tn1,tn2,tn3,tn4].

Next, according to the first classification result, a step to be subsequently performed is determined, i.e., performing step S4.

Under the condition that the classification result of the first classification is a first result, the following steps are performed: S41, extracting a second feature of the image to be processed by using a second feature extractor; S51, performing second classification on the image to be processed according to the second features by using a second classifier; and S6, outputting the classification result, for example, outputting the classification result of the second classification.

In some embodiments, the first result indicates that the fundus photograph comprises the features of diabetic retinopathy. The second feature comprises the features of diabetic retinopathy, and features of other fundus lesions than diabetic retinopathy. The second classification comprises classifying the fundus photograph as a photograph comprising the features of diabetic retinopathy, or a photograph comprising the features of the other fundus lesions. The classification result of the second classification indicates that the fundus photograph comprises the features of diabetic retinopathy or comprises the features of the other fundus lesions.

In other embodiments, that extracting a second feature of the image to be processed using a second feature extractor comprises: respectively extracting a plurality of second features of the image to be processed by using a plurality of second feature extractors cascaded in parallel, and fusing the extracted second features. Correspondingly, the second classification on the image to be processed is performed according to the fused second feature. That cascaded in parallel and fusing here can take a way similar to the processing of the first feature.

In some embodiments, the plurality of second feature extractors comprises different kinds of second feature extractors. For example, the plurality of second feature extractors comprise 3 second feature extractors, which are respectively SE-ResNet, ResNext, InceptionV3 networks.

Under the condition that the classification result of the first classification is a second result, the following steps are performed: S42, extracting a third feature of the image to be processed by using a third feature extractor; S52, performing third classification on the image to be processed according to the third feature by using a third classifier; and S6, outputting the classification result, for example, outputting the classification result of the third classification.

In some embodiments, under the condition that the classification result is the second result, the classification result of the first classification can also be directly output without performing extraction and classification of the third feature.

In some embodiments, the second result indicates that the fundus photograph excludes the features of diabetic retinopathy. The third feature comprises the features without fundus lesions and the features of the other fundus lesions. The third classification comprises classifying the fundus photograph as a photograph excluding the features of fundus lesions, or a photograph comprising the features of other fundus lesions. Correspondingly, the classification result of the third classification indicates that the fundus photograph comprises the features of other fundus lesions or excludes the features of the fundus lesions.

In other embodiments, that extracting a third feature of the image to be processed by using a third feature extractor comprises: respectively extracting a plurality of third features of the image to be processed by using a plurality of third feature extractors cascaded in parallel, and fusing the extracted third features. Correspondingly, the third classification on the image to be processed is performed according to the fused third feature. That cascaded in parallel and fusing here can take a way similar to the processing of the first feature.

In some embodiments, the plurality of third feature extractors comprise different kinds of third feature extractors. For example, the plurality of third feature extractors comprises 3 third feature extractors, which are respectively SE-ResNet, ResNext, InceptionV3 networks.

How to train the feature extractors and classifiers will be described in detail below in connection with examples.

In some embodiments, different feature extractors can be trained on different data sets. For example, the first feature extractor is configured to extract the features of DR and the features of non-DR (comprising normal fundus and other lesions) in the fundus photograph. The second feature extractor is configured to extract the features of DR and the features of other fundus lesions in the fundus photograph. Here, it is possible to focus only on abnormal fundus photographs among the fundus photographs to be processed, instead of normal fundus photographs, because the second feature extractor is intended to distinguish the features of DR from the features of other lesions. The third feature extractor is configured to extract the features of the normal fundus and other lesions than DR in the fundus photograph.

For example, the fundus photograph can be labeled, and the photograph comprising DR is labelled 1, while in other cases (comprising the normal fundus and the other lesions), it is labelled 0, so that a dataset 1 is constructed. The fundus photograph can also be labeled in another way, i.e. only the fundus photograph comprising lesions is labeled, for example, the fundus photograph comprising DR is labeled 1, and the fundus photograph comprising other lesions is labeled 0, so that a data set 2 is constructed. The normal fundus photograph is labeled 0, and the fundus photograph comprising other lesions than DR is labeled 1, so that a data set 3 is constructed. By standardizing the data sets and labeling different data sets in different ways, a variety of deep networks focusing on different features can be trained, which can make full use of information in the fundus photograph.

In some embodiments, the above 3 data sets are independent of and not repeated with each other. The 3 data sets can all be divided into a training set, a validation set, and a test set in a certain ratio (e.g., 8:1:1). The training sets and validation sets of the 3 data sets are used for training and validating the plurality of feature extraction networks separately.

For example, the feature extractor can be trained by transfer learning of a plurality of classical image classification deep neural networks. The classical image classification deep neural network here is, for example, SE-ResNet, ResNext, InceptionV3. The transfer learning is a machine learning method, which means that a pre-trained model is reused in another task. That is, in the embodiment of the present application, an existing trained model (i.e., an object of the transfer learning) is used as the pre-trained model, and the feature extractor is trained on the training set and the validation set. For example, when loss of the training set and the validation set tends to be gentle, parameters and networks before a certain layer among these models are intercepted to form the feature extractor. The features and feature dimensions extracted by different layers are different, and can be used for more tasks. In this way, depth features of the fundus photograph can be extracted.

In some embodiments, parameters and networks before a penultimate layer of each model are intercepted to form the feature extractor. Of course, the intercepted parameters and networks can also comprise parameters and networks of the penultimate layer of the model. Since the transferred model is generally a classification model, the penultimate layer of each model network is generally a fully connected layer, layers before the penultimate layer comprise, for example, an input layer and a hidden layer, and the specific configuration, such as the number of layers and the number of neurons, varies with the transferred model. In a specific embodiment, the number of the transferred models and the network layers for feature extraction can be different.

In some embodiments, the depth features extracted by the plurality of feature extractors can be fused to form a set of depth features.

As an example, the SE-ResNet, ResNext, InceptionV3 networks and models are transferred separately, and the classification model is trained on the training set and the validation set of the dataset 1, the dataset 2, and the dataset 3. Because of the provision of the datasets, the model trained on the dataset 1 focuses on the features of DR and the features of non-DR (the normal fundus and the other lesions) in the fundus photograph; the model trained on the data set 2 more focuses on the features of DR and the features of other fundus lesions in the abnormal fundus photograph; and the model trained on the data set 3 more focuses on the features of the normal fundus and the features of the other lesions than DR in the fundus photograph. In the process of training the models, when the loss of the training set and the validation set tends to be gentle, the training is stopped.

There can comprise n first feature extractors trained with the dataset 1, which are, for example, feature_extraction1_1, feature_extraction1_2, feature_extraction1_3, . . . feature_extraction1_n, respectively, where n is a positive integer. Features extracted by the n first feature extractors are spliced according to samples, to form a fused first feature data set 1.

In some embodiments, 3 first feature extractors are trained, e.g., the feature_extraction1_1, the feature_extraction1_2, and the feature_extraction1_3 are SE-ResNet, ResNext, InceptionV3 models, respectively. First features extracted by the 3 first feature extractors can be transversely spliced to obtain the fused first feature data set 1.

There can comprise m second feature extractors trained with the dataset 2, which are, for example, feature_extraction2_1, feature_extraction2_2, feature_extraction2_3, . . . feature_extraction2_m, respectively, where m is a positive integer. m can be equal to or different from n. Features extracted by the m second feature extractors are spliced according to samples, to form a fused second feature data set 2.

In some embodiments, 3 second feature extractors are trained, e.g. the feature_extraction2_1, the feature_extraction2_2, and the feature_extraction2_3 are SE-ResNet, ResNext, InceptionV3 models, respectively. Second features extracted by the 3 second feature extractors can be transversely spliced to obtain the fused second feature data set 2.

There can comprise k third feature extractors trained with the dataset 3, which are, for example, feature_extraction3_1, feature_extraction3_2, feature_extraction3_3, . . .

feature_extraction3_k, respectively, where k is a positive integer. k can be equal to or different from m and n. Features extracted by the k third feature extractors are spliced according to samples, to form a fused third feature data set 3.

In some embodiments, 3 second feature extractors are trained, e.g. the feature_extraction3_1, the feature_extraction3_2, and the feature_extraction3_3 are SE-ResNet, ResNext, InceptionV3 models, respectively. Third features extracted by the 3 third feature extractors can be transversely spliced to obtain the fused third feature data set 3.

Each fused feature data set can be used for training a corresponding classifier. In some embodiments, at least one of the first classifier, the second classifier, and the third classifier is an Xgboost classifier. For example, the first classifier, the second classifier, and the third classifier are all Xgboost classifiers. A classification algorithm of the Xgboost classifier is an integrated learning method based on Boosting. The use of the Xgboost classifier can prevent over fitting and improve classification accuracy, and parallel optimization can improve algorithm efficiency.

For example, a plurality of deep neural networks are cascaded in parallel, and feature outputs of a plurality of network intermediate layers are spliced and fused for training the Xgboost classifier. Different Xgboost classifiers are trained on different datasets. Data of a plurality of data sets can also be put together for testing the overall performance of the model.

The fused feature data sets are separately used for training, by adopting 10-fold cross validation, 3 Xgboost classifiers which are respectively XGB_classification1, XGB_classification2 and XGB_classification3. The 10-fold cross validation is used for testing algorithm accuracy, that is, the data set can be divided into ten parts, wherein 9 parts are taken as training data and 1 part is taken as test data in turn for making experiments. The Xgboost classifier trained with depth features extracted by integrating multiple models focuses on more diverse high-level features in the fundus photograph, which can improve the classification performance to a certain extent.

In applications, the first feature extractors feature_extraction1_1-n are cascaded in parallel, and then the extracted features are spliced and then classified by the XGB_classification1. The XGB_classification2 or XGB_classification3 is cascaded in series according to the classification result thereof. If the XGB_classification1 is classified as 1, the original fundus photograph is fed into the feature_extraction2_1-m cascaded in parallel to extract depth features, and then the classification is performed by using the XGB_classification2, and the classification result is output as the final result. If the XGB_classification1 is classified as 0, the final classification result can be directly output as 0. Of course, the original fundus photograph can also be further fed into the feature_extraction3_1-3 cascaded in parallel to extract the depth features, and then the classification is performed by using the XGB_classification3.

Compared with a single classification model, the cascaded classification model can recognize the DR and other lesions than DR more effectively, and can further improve the screening accuracy of the DR. The test result shows that: compared with the single classification model, the accuracy, specificity and positive predictive value of the cascaded classification model all are greatly improved.

In the above embodiment, the feature values are extracted by the deep neural network for training the classifier, so that the complex process of manual feature extraction is avoided. In addition, the features of the fundus photograph, which are extracted by the plurality of deep neural networks, are fused, so that the dimensions of the features are increased, and thus, the trained screening classifier for diabetic retinopathy has better performance and generalization capability.

Figure 2:
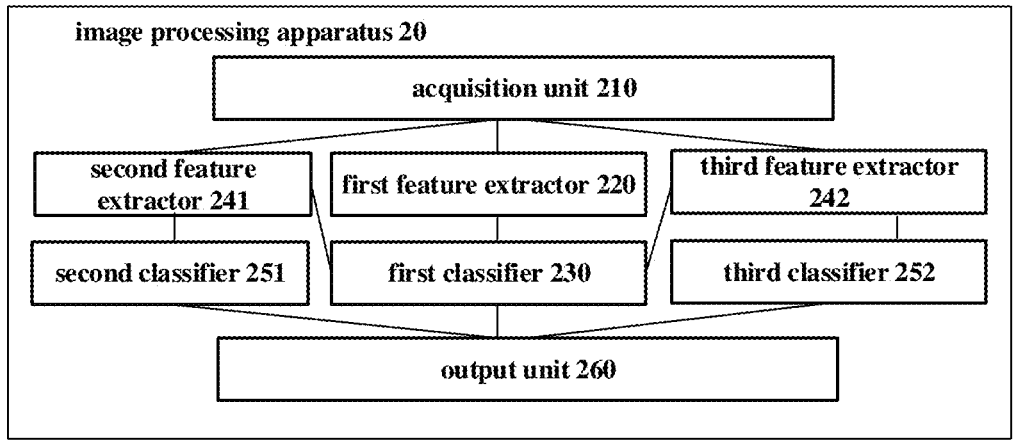
FIG. 2 is a block diagram illustrating an image processing apparatus according to an embodiment of the present disclosure.

FIG. 2 is a block diagram illustrating an image processing apparatus according to an embodiment of the present disclosure.

As shown in FIG. 2, the image processing apparatus 20 comprises: an acquisition unit 210 configured to acquire an image to be processed, for example, performing step S1; a first feature extractor 220 configured to extract a first feature of the image to be processed, for example, performing step S2; a first classifier 230 configured to perform first classification on the image to be processed, for example, performing step S3; a second feature extractor 241 configured to extract a second feature of the image to be processed under the condition that the classification result is a first result, for example, performing step S41; and a second classifier 251 configured to perform a second classification on the image to be processed according to the second feature, for example, performing step S51.

In some embodiments, the image processing apparatus 20 further comprises: an output unit 260 configured to output the classification result, for example, performing step S6, to output the classification result of the second classification. For example, the output unit 260 can output the classification result by using a display, a player, or the like.

In some embodiments, the image processing apparatus further comprises: a third feature extractor 242 configured to extract a third feature of the image to be processed under the condition that the classification result is a second result, for example, performing step S42; a third classifier 252 configured to perform a third classification on the image to be processed according to the third feature, for example, performing step S52. Correspondingly, the output unit 260 is configured to output the classification result of the third classification, for example, performing step S6. It should be understood that the output unit 260 can also be configured to output the classification result of the first classification.

Figure 3:
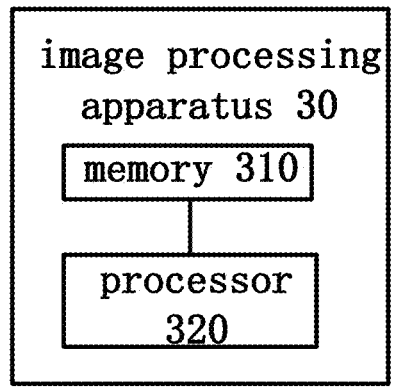
FIG. 3 is a block diagram illustrating an image processing apparatus according to another embodiment of the present disclosure.

FIG. 3 is a block diagram illustrating an image processing apparatus according to another embodiment of the present disclosure.

As shown in FIG. 3, the image processing apparatus 30 comprises: a memory 310 and a processor 320 coupled to the memory 310. The memory 310 is configured to store instructions for performing corresponding embodiments of the image processing method. The processor 320 is configured to perform, based on the instructions stored in the memory 310, one or more steps of the image processing method in any of some embodiments of the present disclosure.

It should be understood that the steps of the foregoing image processing method can be implemented by the processor, and can be implemented by any of software, hardware, firmware, or a combination thereof.

In addition to the image processing method and apparatus, the embodiments of the present disclosure can also take a form of a computer program product implemented on one or more non-volatile storage media containing computer program instructions. Accordingly, the embodiments of the present disclosure further provide a computer-readable storage medium having thereon stored computer instructions which, when executed by a processor, implement the image processing method in any of the foregoing embodiments.

The embodiments of the present disclosure further provides a screening system of diabetic retinopathy, comprising the image processing apparatus described in any of the foregoing embodiments.

Figure 4A:
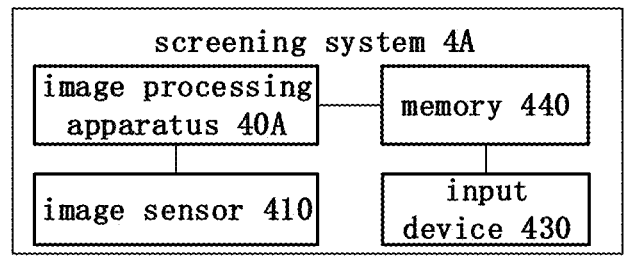
FIG. 4A is a block diagram illustrating a screening system according to an embodiment of the present disclosure.

FIG. 4A is a block diagram illustrating a screening system according to an embodiment of the present disclosure.

As shown in FIG. 4A, the screening system 4A comprises an image processing apparatus 40A. The image processing apparatus 40A is configured to perform the image processing method described in any of the foregoing embodiments. The image processing apparatus 40A can be structurally similar to the foregoing image processing apparatus 20 or 30, and configured to perform classification on the fundus photograph of the user.

In some embodiments, the screening system 4A further comprises: an image sensor 410 configured to take the fundus photograph of the user. The image sensor is, for example, a camera.

The screening system 4A can be implemented in a local service manner, i.e., the image sensor and the image processing apparatus are both located on a user side.

In some embodiments, the screening system 4A further comprises: an input device 430 configured to input the user information. The input device 430 can acquire the user information by means of, for example, text, sound, or image. The screening system 4A can further comprise: a memory 440 configured to store the user information and the classification result in association. The input device 430 and the memory 440 can both be located on the user side.

Figure 4B:
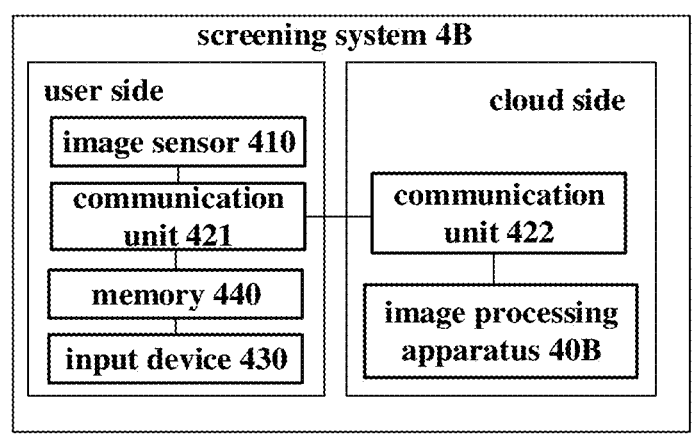
FIG. 4B is a block diagram illustrating a screening system according to another embodiment of the present disclosure.

FIG. 4B is a block diagram illustrating a screening system according to another embodiment of the present disclosure. FIG. 4B is different from FIG. 4A only in that the image processing apparatus is located on a cloud side, and the screening system further comprises a communication unit. Only differences between FIG. 4B and FIG. 4A will be described below, and similarities will not be repeated.

The screening system 4B in FIG. 4B is implemented in a cloud service manner. As shown in FIG. 4B, the image sensor 410 is located on the user side, and the image processing apparatus 40B is located on the cloud side, and the image processing apparatus 40B on the cloud side can provide services for a plurality of users at the same or different time.

Under the condition that the image sensor 410 and the image processing apparatus 40B are located on different sides, for example, the image sensor 410 is located on the user side while the image processing apparatus 40 is located on the cloud side, the screening system 4B, on the user side and on the cloud side, respectively comprises: a communication unit 421 configured to transmit the fundus photograph taken on the user side to the image processing apparatus; and a communication unit 422 configured to transmit the classification result of the fundus photograph by the image processing apparatus to the user side.

The communication units can communicate with each other, for example, via a network. The network can be a wireless network, a wired network, and/or any combination of wireless and wired networks, and can comprise a local area network, the Internet, a telecommunication network, an Internet of Things based on the Internet and/or telecommunication network, and/or any combination of the above, etc. The wired network can use, for example, twisted pair, coaxial cable, or optical fiber transmission for communication, and the wireless network can use, for example, 3G/4G/5G mobile communication network, Bluetooth, Zigbee, or Wi-Fi for communication.

The embodiments of the present disclosure further provide an assisted diagnostic system of diabetic retinopathy, which can implement the image processing method described in any of the foregoing embodiments, for example, implement the automatic screening of diabetic retinopathy through software, to improve diagnosis efficiency and accuracy. In some embodiments, the system also saves historical reports of the user, which facilitates the course management.

According to the embodiments of the present disclosure, the assisted diagnostic system can be divided into privatized and SaaS versions. The privatized version meets the requirement that a hospital cannot be connected to an external network, and the SaaS version is suitable for grassroots medical treatment which, under the condition that a server cannot be purchased due to limited cost, is provided with a cloud service, for uploading the fundus data to the cloud side for processing and returning the processed result.

Figure 5A:
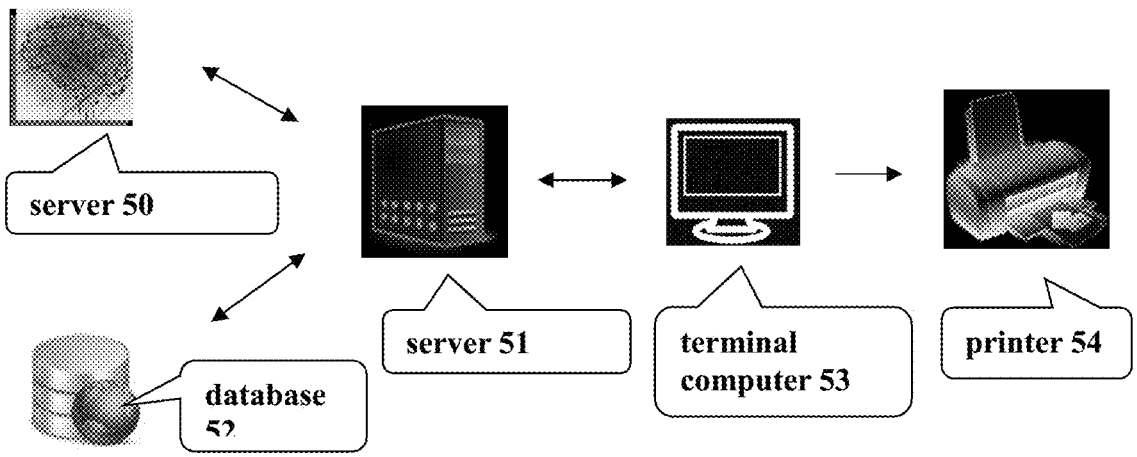
FIG. 5A is a schematic diagram illustrating an assisted diagnostic system according to an embodiment of the present disclosure.

FIG. 5A is a schematic diagram illustrating an assisted diagnostic system according to an embodiment of the present disclosure. As shown in FIG. 5A, the assisted diagnosis system 5 comprises a server 51, a database 52, a terminal computer 53, and a printer 54.

For the privatized version, the above image processing apparatus, together with the server 51, the database 52, the terminal computer 53, and the printer 54, can be located on the user side (e.g., a hospital), for inputting the user information, providing the assisted diagnosis service, outputting (e.g., printing) the classification result, and the like. The above image sensor, input device, memory, etc. can be integral parts of the terminal computer 53. The printer 54 is one implementation of the foregoing output unit.

For the SaaS version, the assisted diagnosis system 5 further comprises a server 50. The above image processing apparatus, together with the server 50 and the server 51, can be located on the cloud side, for performing classification on the image and providing the assisted diagnosis service; and the image sensor, input device, etc., together with the terminal computer 53 and printer 54, can be located on the user side, for taking images, inputting the user information, printing the classification result, and the like. For example, the image sensor, the input device, etc. can be integral parts of the terminal computer 53. The terminal computer 53 performs data interaction with the server 50 and the database 52 through the server 51.

Figure 5B:
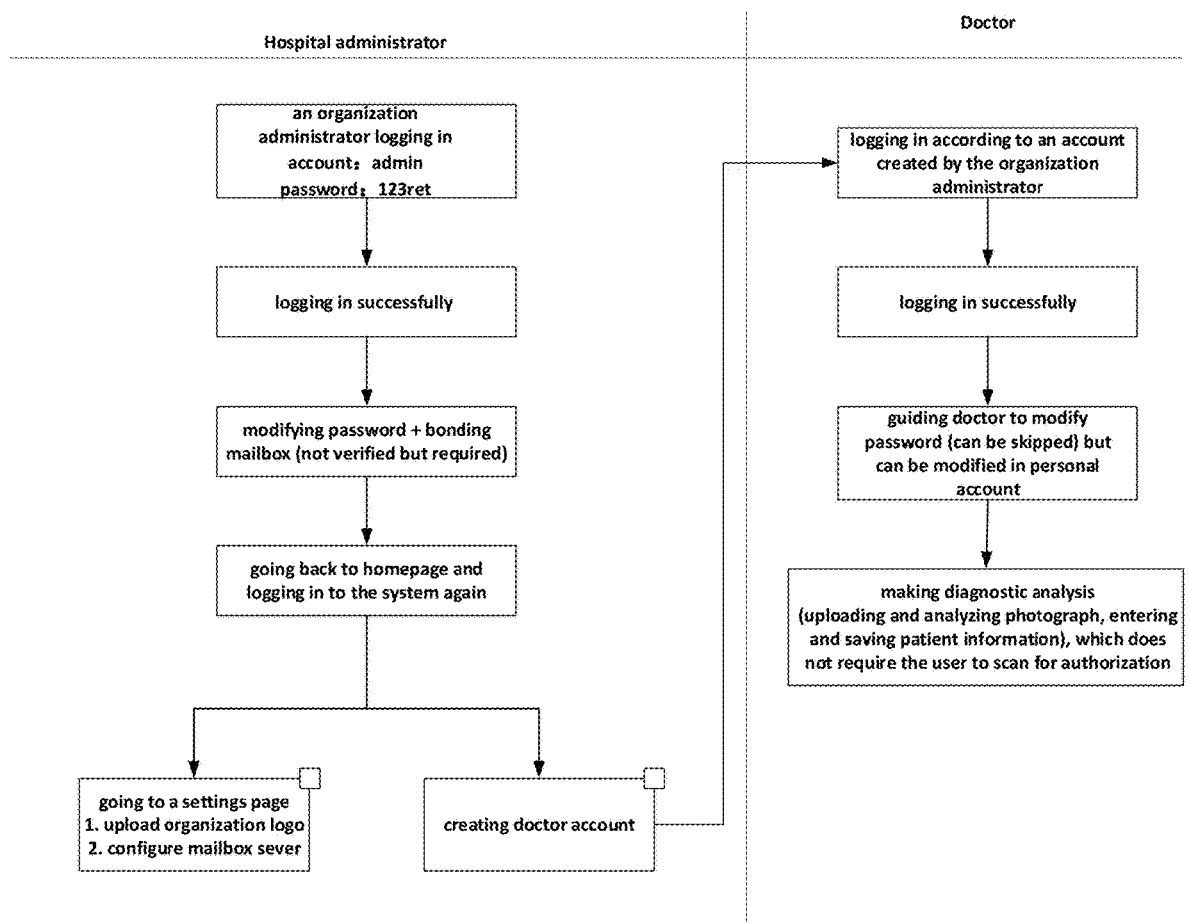
FIG. 5B is a business flow diagram illustrating a privatized version of assisted diagnostic system according to an embodiment of the present disclosure.

FIG. 5B is a business flow diagram illustrating a privatized version of assisted diagnostic system according to an embodiment of the present disclosure. As shown in FIG. 5B, the privatized version mainly has functions of doctor account management, assisted diagnosis and historical report viewing.

The doctor account management mainly comprises the following functions:

(1) an organization, after successful purchase and installation, logging in by using a configured account and password and entering a "doctor management" page;

(2) clicking "create doctor account" to enter a "doctor information" page, and filling in doctor information, wherein "name" and "doctor's phone" are required;

(3) clicking "OK" to finish the creation of the doctor account;

(4) clicking "reset password" on a right side of the doctor information to reset the account password to an initial password "ret123";

(5) inputting a doctor name in a search box, and clicking a "search" button to search the doctor information;

(6) clicking a "reset" button to restore a doctor list;

(7) clicking a "number of diagnosis" button for arrangement in ascending or descending order according to the number of diagnosis; and (8) clicking an icon below "enabled/disabled" to realize enabled and disabled settings of the doctor account.

The assisted diagnosis mainly comprises the following functions:

(1) after successful purchase and installation, a doctor logging in by using an account and password generated by the organization and entering a "diagnostic analysis" page;

(2) filling in patient information in a "patient information entry" area, wherein "name", "sex" and "date of birth" are required, and "mobile phone number" and "patient's self-description" are optional but are recommended to be filled in so as to more comprehensively understand the patient information; note that: please enter the patient information correctly; otherwise, information mismatch or loss will occur.

(3) respectively clicking "+" in uploading boxes of left and right eye images to upload the fundus images, wherein the left and right eye images should, when uploaded, be distinguished, and clicking a 'upload again' button if the image is uploaded wrongly or unsuccessfully, to upload the image again;

(4) clicking a 'start analysis' button to analyze data, and after about 10s of analysis, automatically jumping to a 'diagnosis analysis' interface, and if no result is returned for a long time, prompting "the network is timeout or abnormal, and please retry", and clicking the "start analysis" button again;

(5) filling in "medical advice" information on a "diagnosis analysis result" interface, wherein the "medical advice" is required;

(6) clicking a "finish" button to generate a report and save report information; and (7) clicking a "print" button to print the report, or clicking "download" to download the report.

The historical report viewing mainly comprises the following functions:

(1) the organization, after successful purchase and installation, logging in by using the configured account and password and entering the "doctor management" page; and the doctor logging in by using the account and password generated by the organization and entering the "diagnostic analysis" page; and (2) clicking "historical report" to enter a "historical report" page.

Figure 5C:
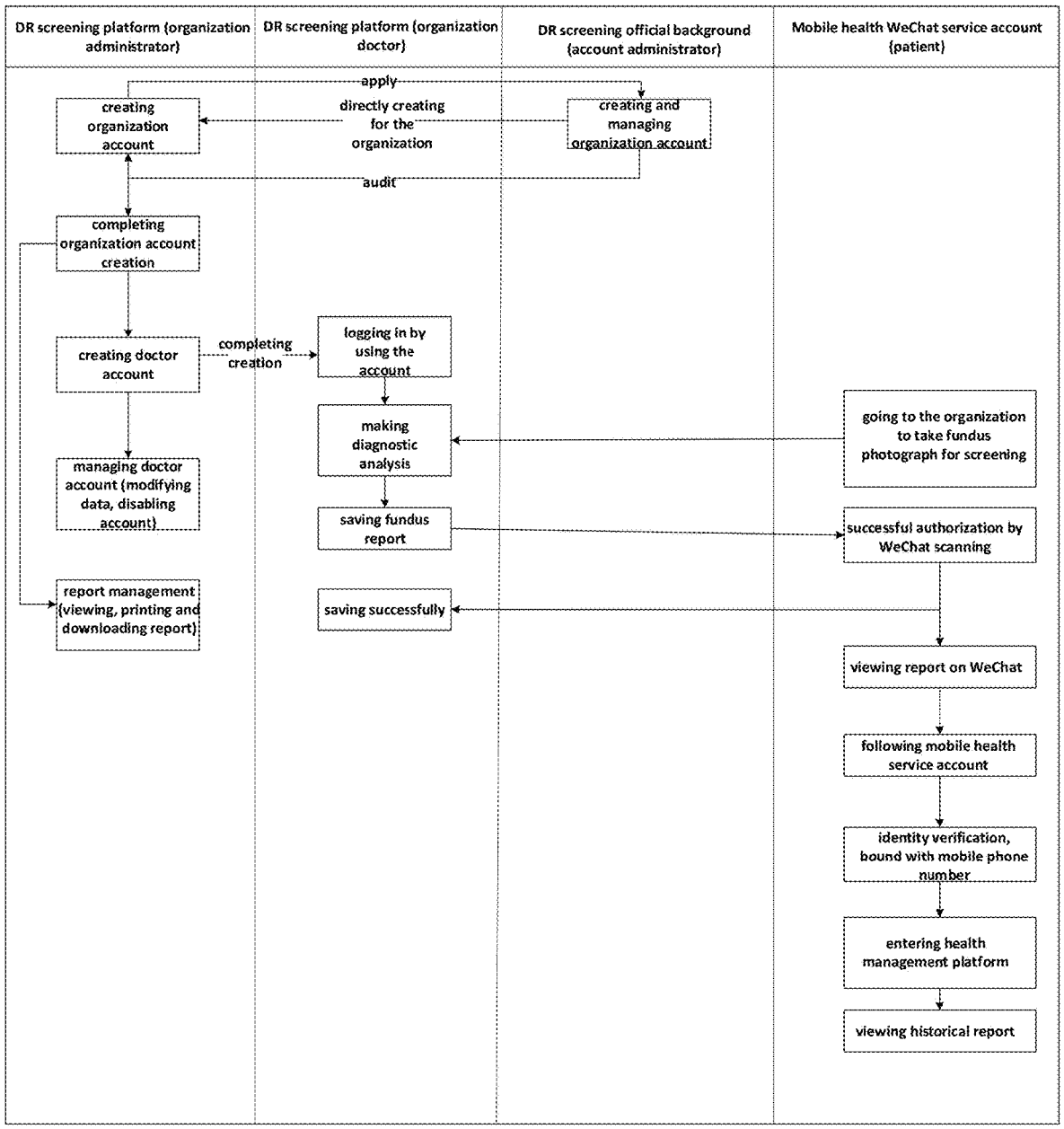
FIG. 5C is a business flow diagram illustrating a SaaS version of assisted diagnosis system according to an embodiment of the present disclosure.

FIG. 5C is a business flow diagram illustrating a SaaS version of assisted diagnosis system according to some embodiments of the present disclosure. As shown in FIG. 5C, the SaaS version mainly has functions of organization account management, doctor account management, assisted diagnosis, and historical report viewing.

The organization account management mainly comprises the following functions:

(1) an account administrator successfully logging in the system and entering an "organization management" page;

(2) clicking "create organization account" to enter a "create organization account" page, filling in organization information, wherein "organization name" and "mailbox account" are required, and after the organization is successfully created, an organization administrator is required to log in a mailbox to verify the login;

(3) clicking "detailed data" to view detailed information of the organization;

(4) clicking a button below "enabled/disabled" to enable and disable the organization account;

(5) clicking "audit request" to enter an "audit request" page, on which an organization audit list is displayed;

(6) clicking "under audit" in the "audit request" page to enter an organization detailed information page; and (7) auditing the organization information, and under the condition that the requirement is met, clicking "pass audit" to enable the organization to use the account number; otherwise, clicking "click to return request".

The doctor account management mainly comprises the following functions:

(1) an organization, after successful purchase and installation, logging in by using an account and password and entering a "doctor management" page;

(2) clicking "create doctor account" to enter a "doctor information" page, filling in doctor information, wherein "name", "sex", "date of birth", "doctor's phone", "doctor's title", "operating year" and "professional qualification number" are all required;

(3) clicking "OK" to create the doctor account;

(4) clicking "modify data" on a right side of the doctor information to jump to the "doctor information" page to modify the information of the doctor information page;

(5) inputting a doctor name in a search box, and clicking a search button to search the doctor information;

(6) clicking a "reset" button to restore the doctor list;

(7) clicking a "number of diagnosis" button for arrangement in ascending or descending order according to the number of diagnosis; and (8) clicking an icon below "enabled/disabled" to enable and disable the doctor account.

In the assisted diagnosis functions of the SaaS version, operations (1) to (6) are the same as those of the privatized version, but after clicking "finish", a two-dimension code can be automatically generated. The user (e.g. the patient) can view the report by scanning the two-dimension code and view a historical report through a corresponding mobile health service account, and it is jumped to an assisted diagnosis report page after the two-dimension code is scanned.

The historical report viewing function of the SaaS version has the same operations as those of the privatized version.

Figure 6:
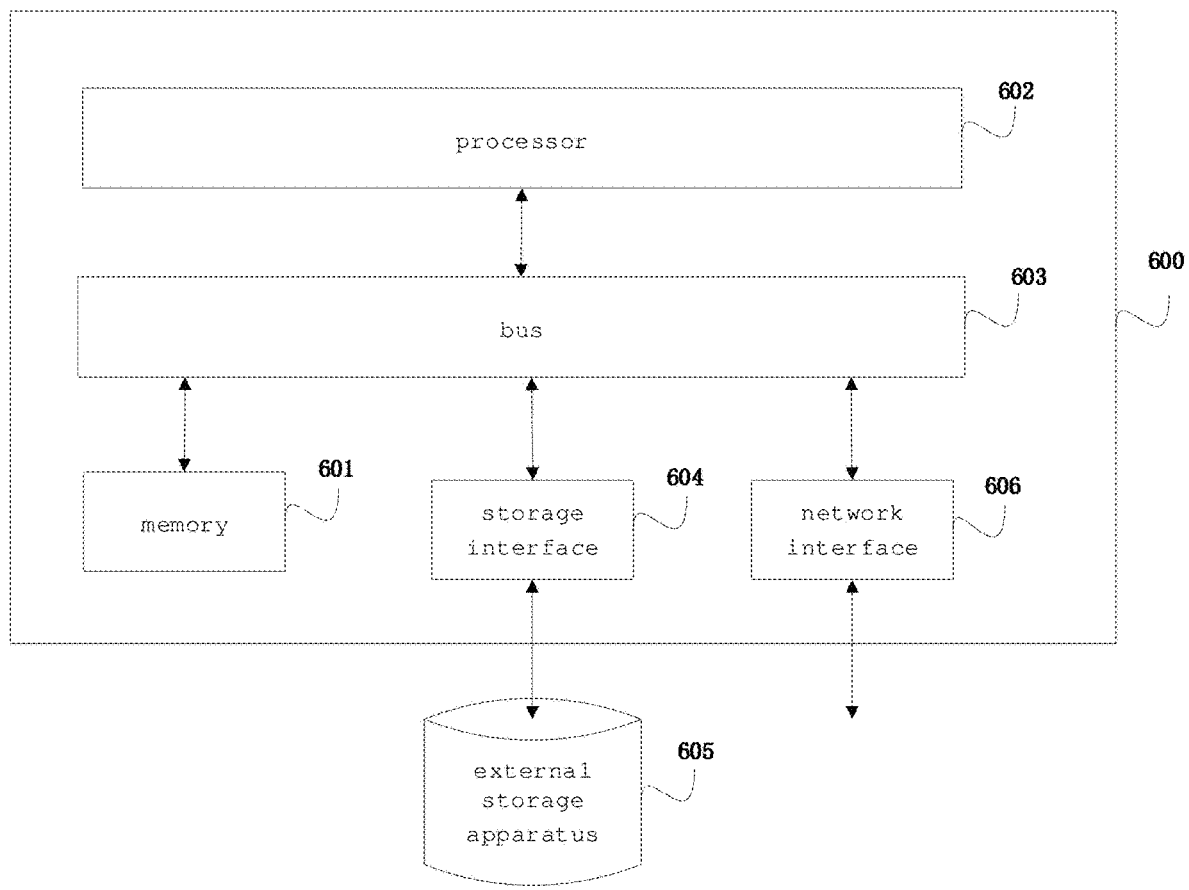
FIG. 6 is a block diagram illustrating a computer system for implementing an embodiment of the present disclosure.

FIG. 6 is a block diagram illustrating a computer system for implementing an embodiment of the present disclosure.

As shown in FIG. 6, the computer system can be represented in the form of a general-purpose computing device, and can be configured to implement the image processing method of the above embodiments. The computer system comprises a memory 610, a processor 620, and a bus 600 connecting various system components.

The memory 610 can comprise, for example, a system memory, a non-volatile storage medium, and the like. The system memory has thereon stored, for example, an operating system, an application program, a Boot Loader, other programs, etc. The system memory can comprise a volatile storage medium, e.g., a Random Access Memory (RAM) and/or a cache memory. The non-volatile storage medium has thereon stored, for example, instructions for performing the corresponding embodiments of the image processing method. The non-volatile storage medium comprises, but is not limited to, a magnetic disk storage, optical storage, flash memory, and the like.

The processor 620 can be implemented by discrete hardware components, such as general-purpose processors, Digital Signal Processors (DSPs), Application Specific Integrated Circuits (ASICs), Field Programmable Gate Arrays (FPGAs) or other programmable logic devices, discrete gates or transistors, and so on. Correspondingly, each module, such as the judgment module and the determination module, can be implemented by a Central Processing Unit (CPU) executing instructions in the memory to perform the corresponding steps, or can be implemented by a dedicated circuit to perform the corresponding steps.

The bus 600 can use any of a variety of bus structures. For example, the bus structure comprises, but is not limited to, an Industry Standard Architecture (ISA) bus, a Micro Channel Architecture (MCA) bus, and a Peripheral Component Interconnect (PCI) bus.

The computer system can further comprise an input/output interface 630, a network interface 640, a storage interface 650, and the like. These interfaces 630, 640, 650, the memory 610 and the processor 620 can be connected by the bus 600. The input/output interface 630 can provide connection interfaces for an input/output device such as a display, a mouse, and a keyboard. The network interface 640 provides connection interfaces for a variety of networking devices. The storage interface 640 provides connection interfaces for external storage devices such as a floppy disk, a U disk, and an SD card.

Thus far, various embodiments of the present disclosure have been described in detail. Some details well known in the art have not been described in order to avoid obscuring the concepts of the present disclosure. Those skilled in the art can now fully appreciate how to implement the solutions disclosed herein, in view of the foregoing description.

Although some specific embodiments of the present disclosure have been described in detail through examples, it should be understood by those skilled in the art that the above examples are for illustration only and are not intended to limit the scope of the present disclosure. It will be understood by those skilled in the art that modifications to the above embodiments or equivalent substitutions for partial technical features thereof can be made without departing from the scope and spirit of the present disclosure. The scope of the present disclosure is defined by the attached claims.

What is claimed is:

1. An image processing method comprising:
   acquiring an image to be processed;
   extracting a first feature of the image to be processed by using a first feature extractor;
   performing first classification on the image to be processes according to the first feature by using a first classifier;
   under the condition that a classification result of the first classification is a first result, extracting a second feature of the image a second feature extractor;
   performing second classification on the image to be processed according to the second feature by using a second classifier; and
   outputting a classification result of the second classification wherein:
   the extracting a first feature of the image to be processed by using a first feature extractor comprises: respectively extracting a plurality of first features of the image to be processed by using a plurality of first feature extractors cascaded in parallel, and fusing the extracted first features, wherein the first classification is performed on the image to be processed according to the fused first feature.

2. The image processing method according to claim 1, wherein:
   the image to be processed is a fundus photograph;
   the first feature comprises a feature of diabetic retinopathy and a feature of non-diabetic retinopathy; and
   the second feature comprises a feature of diabetic retinopathy and a feature of other fundus lesions than diabetic retinopathy.

3. The image processing method according to claim 2, wherein:
   the first classification comprises classifying the fundus photograph as a photograph comprising the feature of diabetic retinopathy or a photograph excluding the feature of diabetic retinopathy, the first result indicating that the fundus photograph comprises the feature of diabetic retinopathy; and
   the second classification comprises classifying the fundus photograph as a photograph comprising the feature of diabetic retinopathy, or a photograph comprising the feature of other fundus lesions.

4. The image processing method according to claim 1, further comprising:
   under the condition that the classification result of the first classification is a second result, extracting a third feature of the image to be processed by using a third feature extractor;
   performing third classification on the image to be processed according to the third feature by using a third classifier; and
   outputting the classification result of the third classification.

5. The image processing method according to claim 4, wherein:
   the second result indicates that the fundus photograph excludes the feature of diabetic retinopathy;
   the third feature comprises a feature without fundus lesions and the feature of other fundus lesions; and
   the third classification comprises classifying the fundus photograph as a photograph excluding the feature of fundus lesions, or a photograph comprising the feature of other fundus lesions.

6. An image processing method comprising:
   acquiring an image to be processed;
   extracting a first feature of the image to be processed by using a first feature extractor;
   performing first classification on the image to be processed according to the first feature by using a first classifier;
   under the condition that a classification result of the first classification is a first result, extracting a second feature of the image to be processed by using a second feature extractor, performing second classification on the image to be processed according to the second feature by using a second classifier, and outputting a classification result of the second classification; and
   under the condition that the classification result of the first classification is a second result, extracting a third feature of the image to be processed by using a third feature extractor, performing third classification on the image to be processed according to the third feature by using a third classifier, and outputting the classification result of the third classification,
   wherein at least one of the first classifier, the second classifier, or the third classifier is an Xgboost classifier.

7. The image processing method according to claim 4, wherein the extracting a third feature of the image to be processed by using a third feature extractor comprises:
   respectively extracting a plurality of third features of the image to be processed by using a plurality of third feature extractors cascaded in parallel, and fusing the extracted third features, wherein the third classification is performed on the image to be processed according to the fused third feature.

8. The image processing method according to claim 1, further comprising: inputting information of a user, and storing the information of the user and the classification result in association.

9. The image processing method according to claim 1 wherein:
the plurality of first feature extractors comprises different kinds of first feature extractors.

10. An image processing method comprising:
acquiring an image to be processed;
extracting a first feature of the image to be processed by using a first feature extractor;
performing first classification on the image to be processed according to the first feature by using a first classifier;
under the condition that a classification result of the first classification is a first result, extracting a second feature of the image to be processed by using a second feature extractor;
performing a second classification on the image to be processed according to the second feature by using a second classifier; and
outputting a classification result of the second classification, wherein:
the plurality of first feature extractors comprises 3 first feature extractors, which are SE-ResNet, ResNext, InceptionV3 networks respectively; and/or
the plurality of second feature extractors comprises 3 second feature extractors, which are SE-ResNet, ResNext, InceptionV3 networks respectively.

11. The image processing method according to claim 1, wherein:
the fusing the extracted first features comprises: transversely splicing the extracted plurality of first features to obtain the fused first feature.

12. An image processing apparatus comprising:
a memory; and
a processor coupled to the memory, the processor being configured to perform, based on instructions stored in the memory, the image processing method according to claim 1.

13. A non-transitory computer-readable storage medium having thereon stored a computer program which, when executed by a processor, implements the image processing method according to claim 1.

14. A screening system of diabetic retinopathy, comprising:
the image processing apparatus of 12, configured to perform classification on a fundus photograph of a user.

15. The screening system according to claim 14, further comprising:
an image sensor configured to capture the fundus photograph of the user.

16. The screening system according to claim 14, further comprising:
an input device configured to input information of the user; and
a memory configured to store the information of the user and the classification result in association.

17. The image processing method according to claim 1, wherein the extracting a second feature of the image to be processed by using a second feature extractor comprises:
respectively extracting a plurality of second features of the image to be processed by using a plurality of second feature extractors cascaded in parallel, and fusing the extracted second features, wherein the second classification is performed on the image to be processed according to the fused second feature.

18. The image processing method according to claim 1, wherein the plurality of second feature extractors comprises different kinds of second feature extractors.

19. The image processing method according to claim 11, wherein the fusing the extracted second features comprises: transversely splicing the extracted plurality of second features to obtain the fused second feature.

* * * * *

UNITED STATES PATENT AND TRADEMARK OFFICE
CERTIFICATE OF CORRECTION

| | | |
|---|---|---|
| PATENT NO. | : 12,014,494 B2 | Page 1 of 1 |
| APPLICATION NO. | : 17/427347 | |
| DATED | : June 18, 2024 | |
| INVENTOR(S) | : Jiao Huang et al. | |

It is certified that error appears in the above-identified patent and that said Letters Patent is hereby corrected as shown below:

In the Specification

Column 1, Line 12, after "under" insert -- 35 --

In the Claims

Column 15, Lines 39-40, Claim 1, delete "processes" and insert -- processed --

Column 15, Line 44, Claim 1, after "image" insert -- to be processed by using --

Column 15, Lines 48-49, Claim 1, delete "classification" and insert -- classification, --

Signed and Sealed this
Sixth Day of August, 2024

Katherine Kelly Vidal
*Director of the United States Patent and Trademark Office*